(12) United States Patent
Lee et al.

(10) Patent No.: US 7,573,988 B2
(45) Date of Patent: Aug. 11, 2009

(54) SYSTEM AND METHOD FOR PROVIDING CUSTOMIZED VOICE CONNECTION SERVICES VIA GATEKEEPER

(75) Inventors: Fisher Chen-yin Lee, Taipei (TW); Ann Lee, Taipei (TW); David Liu, Taipei (TW)

(73) Assignee: DynaLab Inc., Taipei (TW)

( * ) Notice: Subject to any disclaimer, the term of this patent is extended or adjusted under 35 U.S.C. 154(b) by 1337 days.

(21) Appl. No.: 10/860,590

(22) Filed: Jun. 2, 2004

(65) Prior Publication Data
US 2005/0286711 A1 Dec. 29, 2005

(51) Int. Cl.
*H04M 11/00* (2006.01)
*H04L 12/66* (2006.01)
*H04N 7/173* (2006.01)

(52) U.S. Cl. .................. 379/88.17; 379/106.01; 370/353; 725/106

(58) Field of Classification Search ............ 379/106.01; 370/353; 725/106
See application file for complete search history.

(56) References Cited

U.S. PATENT DOCUMENTS

| | | | |
|---|---|---|---|
| 6,539,077 B1 | 3/2003 | Ranalli et al. | |
| 6,654,456 B1 | 11/2003 | Mandalia et al. | |
| 6,871,188 B2 * | 3/2005 | De Souza | 705/27 |
| 2002/0162116 A1 * | 10/2002 | Read et al. | 725/106 |

* cited by examiner

*Primary Examiner*—Fan Tsang
*Assistant Examiner*—Mohammad K Islam
(74) *Attorney, Agent, or Firm*—Christensen O'Connor Johnson Kindness PLLC

(57) ABSTRACT

A computer-implemented system is provided, including a network consisting of the Internet, PSTN, and CATV network. The network is connected to multiple users' client systems, and also to multiple service provider systems. Each user has a user profile stored in a User Preference Database, while each service provider has service parameters defining the type of its service stored in a Service Database, both of which are connected to the network. The system further includes a Gatekeeper Server, which establishes voice communication among the client systems and the service provider systems. In operation, upon receiving a user's request for service, the Gatekeeper Server identifies one or more service providers whose service parameters match the user's request for service and the user's profile. Upon the user's selection of one such service provider, the Gatekeeper server automatically selects and establishes a preferred mode of voice connection between the user and the selected service provider.

22 Claims, 8 Drawing Sheets

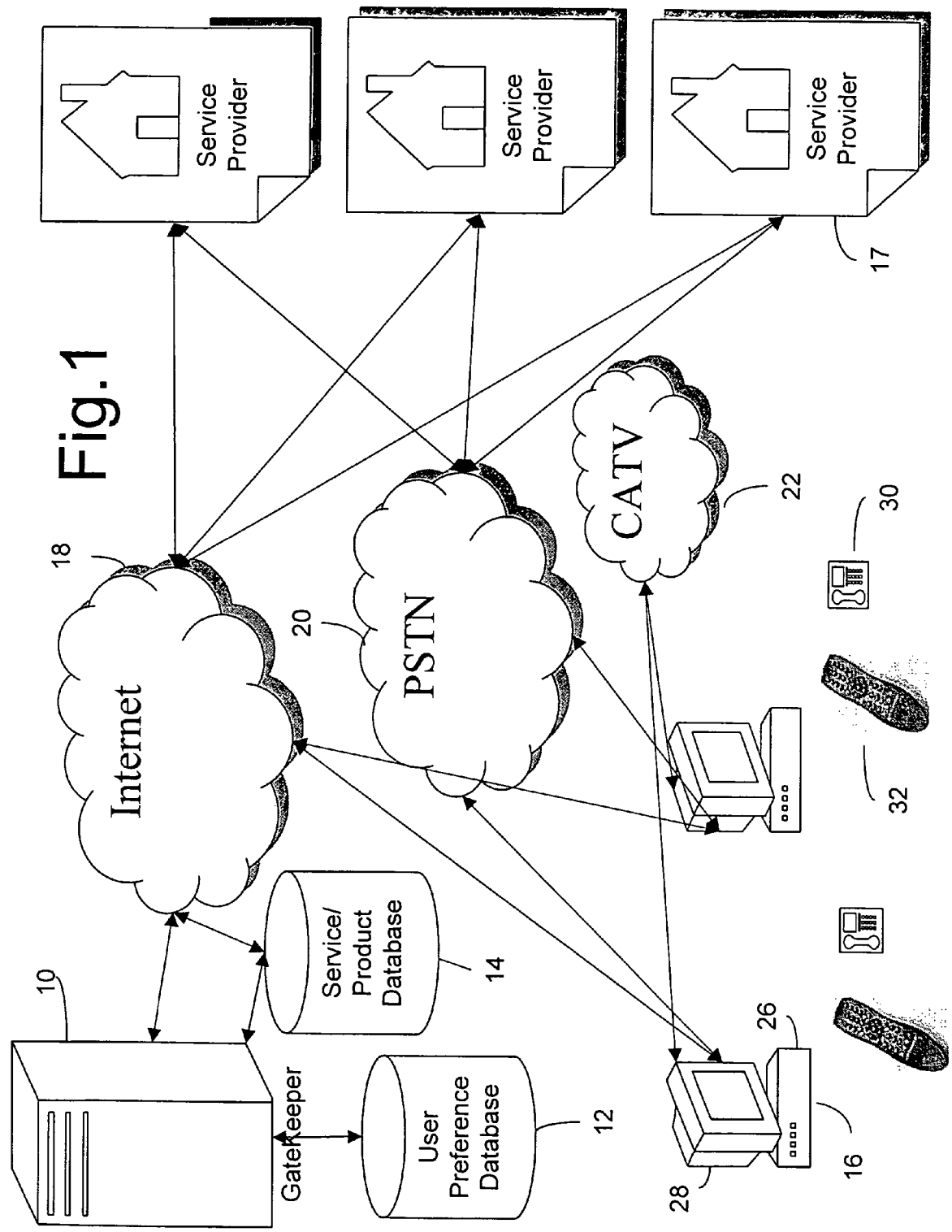

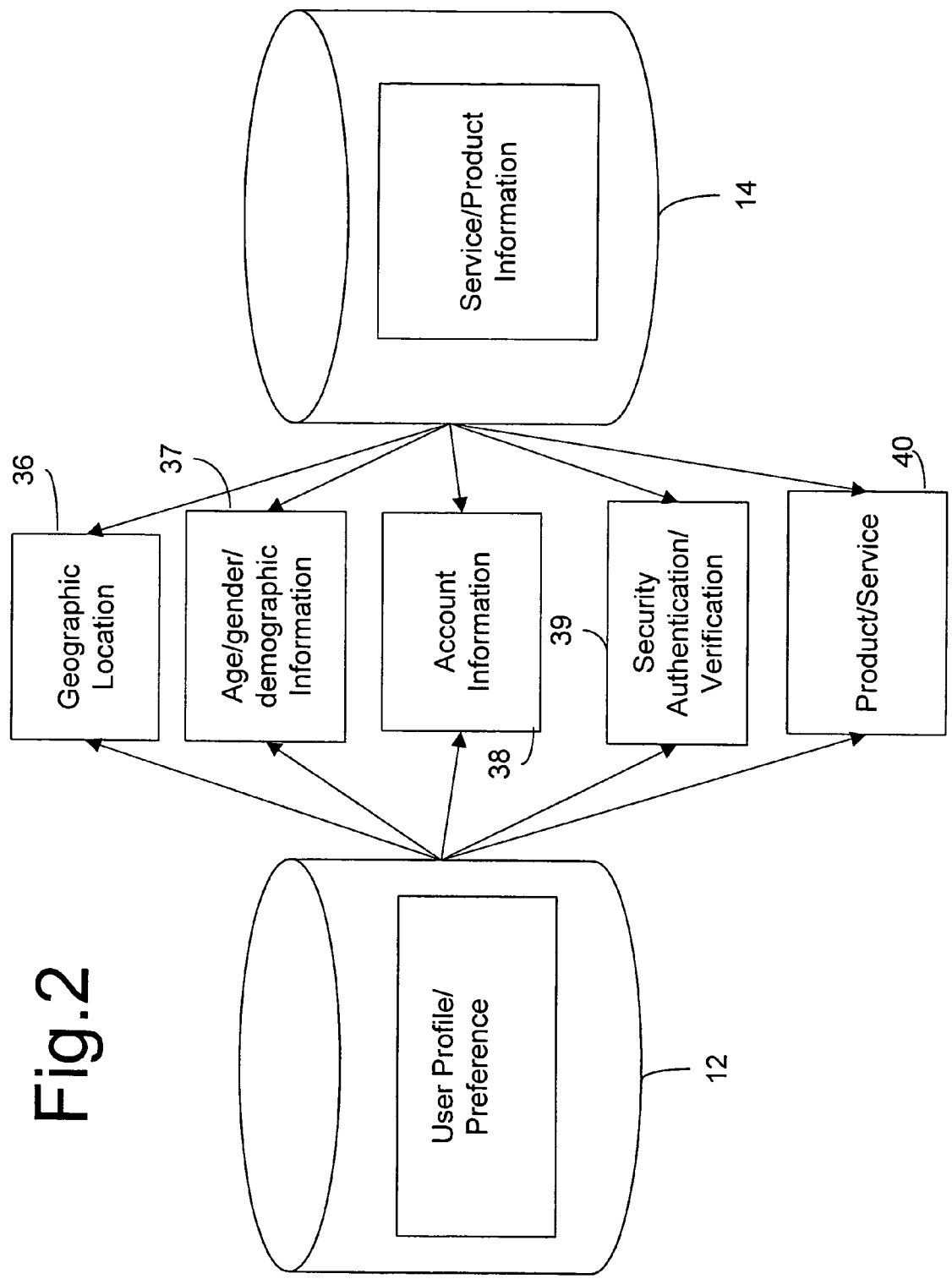

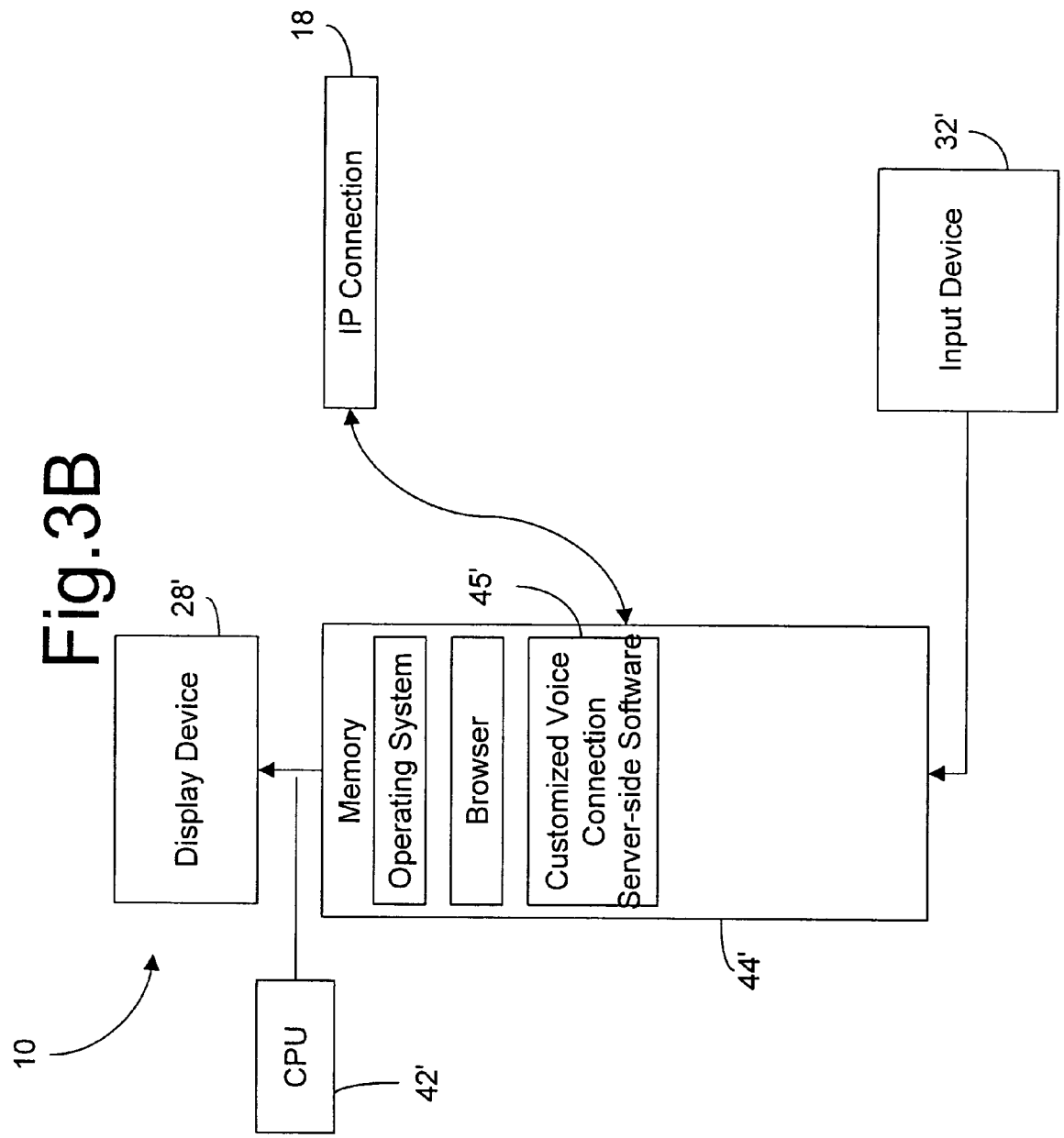

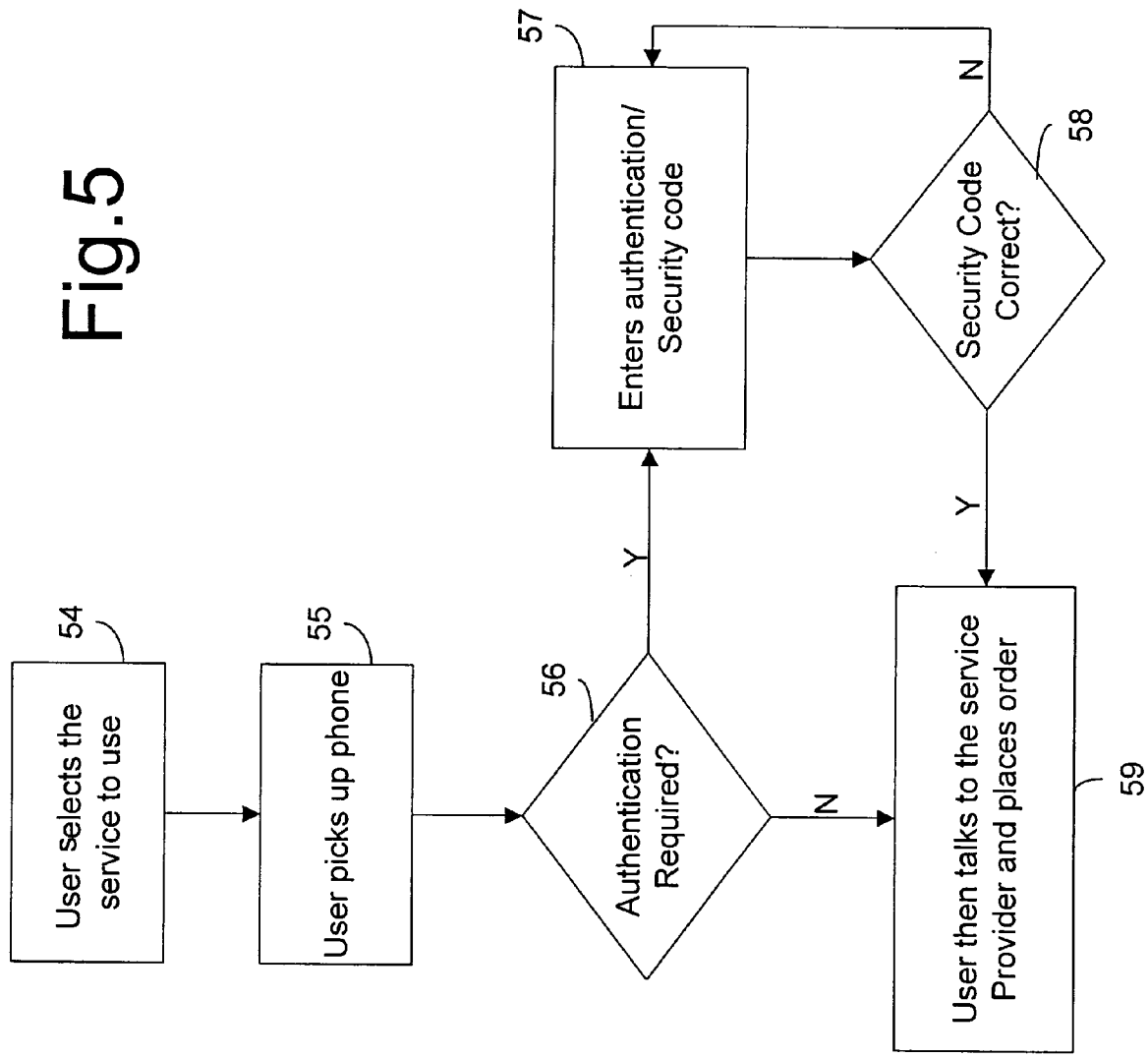

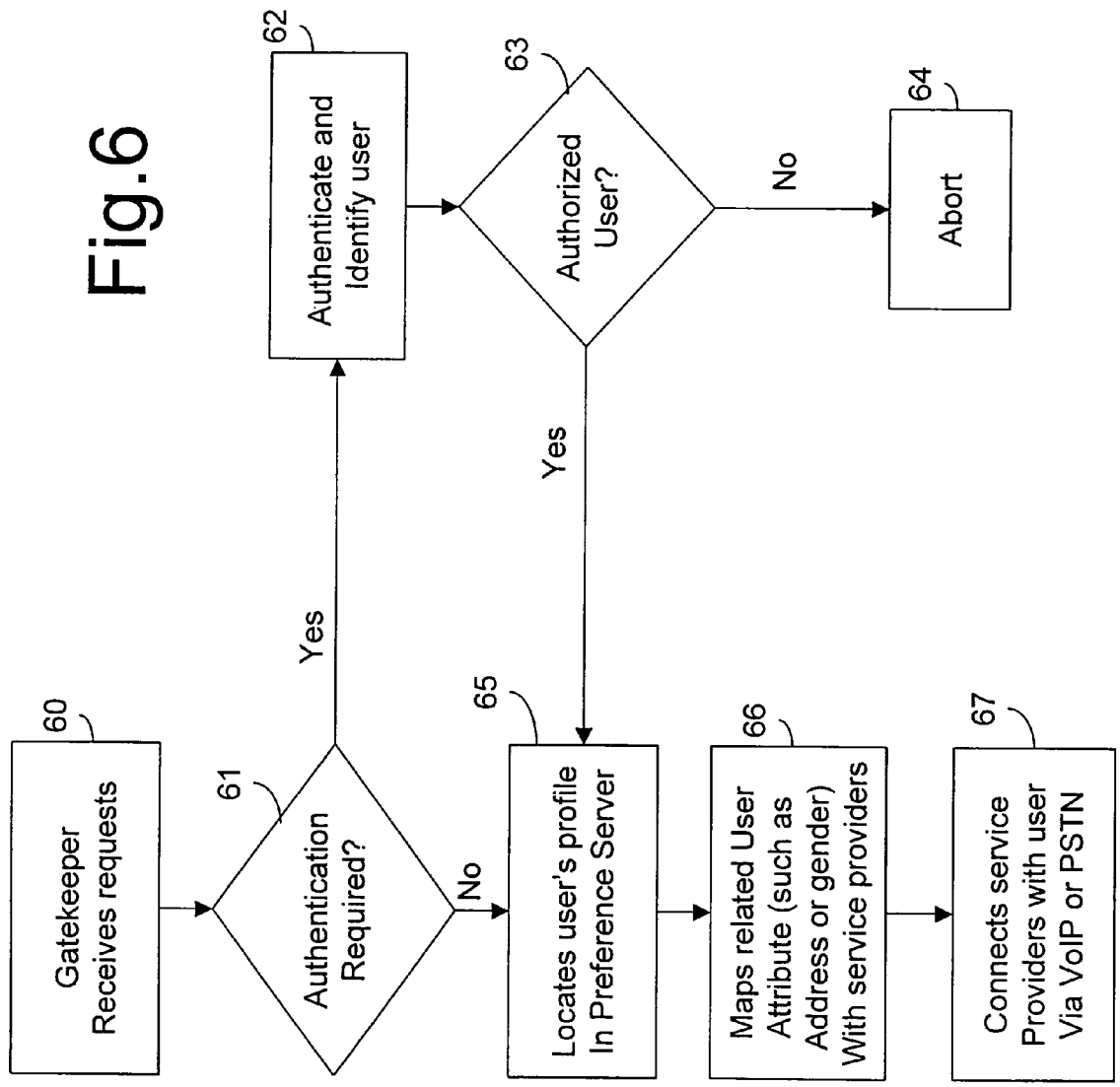

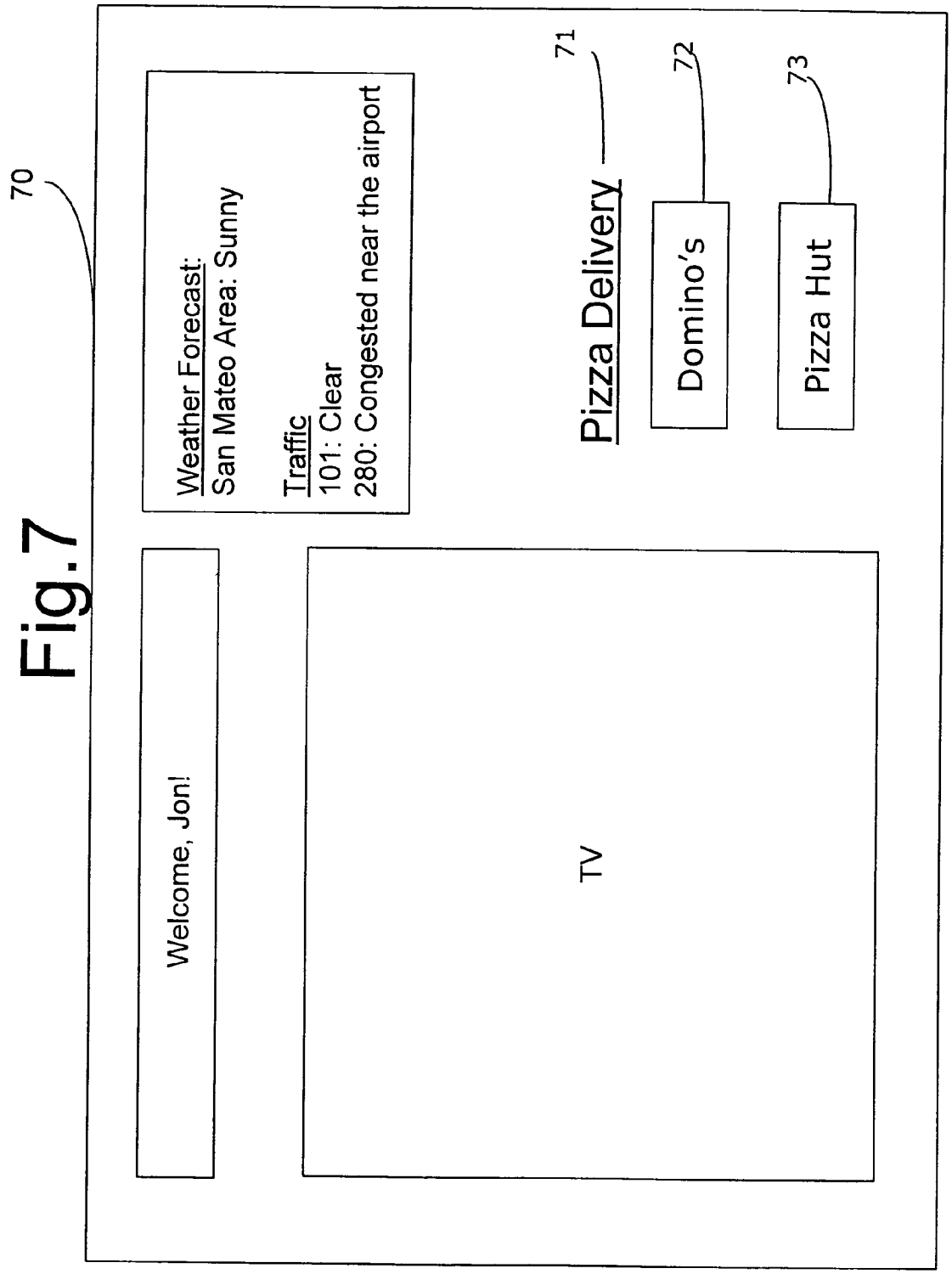

SYSTEM AND METHOD FOR PROVIDING CUSTOMIZED VOICE CONNECTION SERVICES VIA GATEKEEPER

FIELD OF THE INVENTION

The invention is directed to user-interface software and, more particularly, to software that provides a customized voice connection service to a user at his client system, such as a TV settop box system.

BACKGROUND OF THE INVENTION

Personal Computers (PCs) and televisions have traditionally occupied different realms of people's family lives. A PC has been traditionally used by an individual for receiving e-mails and browsing the Internet, or for work and research purposes. A television, on the other hand, has been placed at the center of various family activities, around which family members can gather and enjoy entertainment or watch news reports together. The two devices also require different levels of skills to enjoy. A PC requires more computer-related knowledge, and accordingly, its user group is not as broad as that of the television.

With the advancement of the technology and shifts in the users' behaviors, a PC and other consumer products, such as a television, stereo, DVD player, and telephone, have began to share more and more functions and characteristics. For example, many PCs can now play DVDs, and some televisions and settop boxes can possess as much computer power as a standard PC.

The integration of a phone and a television has also been explored. For example, video conference technology has been developed, combining the large display of a television and the convenience of the Internet and a video system, to permit people to talk to each other while viewing an image of each other. However, the equipment required in video conferencing is fairly expensive and therefore its use is generally limited to business purposes only.

In the co-pending, co-assigned application (System and Method for Dynamically Generating a Customized Menu Page), U.S. patent application Ser. No. 10/703,959, which is explicitly incorporated by reference herein, it has been proposed to add a feature to a television so that a user can easily access information sources and services available on the Internet and other networks via a television set. Specifically, it has been proposed to provide a Menu Page Generator (server) coupled to a User Preference Server. The Menu Page Generator dynamically creates and presents a customized menu page to a user, for example on a television set display, in which various information sources and services that are likely to be of interest to the particular user are arranged in the form of clickable icons, for example. The information sources and services which are likely to be of interest are determined based on the user's predefined preferences and network access history, as stored and managed in the User Preference Server. For example, a customized menu page may include links to the Web sites that the user has frequently visited in the past and which therefore are likely to be of interest to the user, in the form of clickable icons, as well as other popular services such as SMS (ShortMessage Service) and VoIP (Voice over Internet Protocol) services that are also readily accessible to the user by clicking on their corresponding icons.

Thus, the customized menu page system, discussed above, has added a new function to a television set, to thereby permit users, who do not necessarily have computer-related skills, to more easily enjoy information and services that were once accessible only by those with such computer-related skills. However, there remains a need to add even further functions to a television set to continue improving the overall services available to the users, in particular to computer-novice users, through their non-PC client systems such as television sets.

SUMMARY OF THE INVENTION

The present invention proposes to integrate a further function into the system including the Menu Page Generator and the User Preference Server, discussed above. Specifically, the invention integrates a regular PSTN (Public Switched Telephone Network) service to the customized menu page system, discussed above, in addition to the VoIP service. These traditionally separate service components (PSTN phone and VoIP device) in the household can thus be used jointly, with an added ease of use and convenience, to thereby generate even a greater use of, and demand for, the combined phone services (PSTN and VoIP) by family members.

With the advancement of technology, the central and crucial issue is to provide convenience for users. A powerful television settop box (STB) will therefore need a user-friendly user interface (UI) and intuitive operating methods. When new functions are added to a television, the original user habits must be taken into consideration in order for the new technology to bring maximum benefits to the users. In other words, adding any new function should not break the ordinary user's TV viewing habits. With this need in mind, the present invention proposes integrating the Internet, PSTN, and cable television (CATV) network in a particularly user-friendly manner. The integration does not mean that these components still operate as separate entities after integration; the components are not simply combined into one box. Rather, the integration of these components according to the present invention enhances each component's utility, because the integration makes it easier and more convenient for the user to dial phone numbers (via PSTN or VoIP) to establish a voice connection with any desired destination, and further, the act of dialing phone numbers can now be conducted through a television set.

According to one embodiment of the invention, a computer-implemented system includes a network consisting of the Internet, PSTN phone network, and CATV network. Multiple users access the Internet, PSTN, and CATV using their client systems, such as television sets with settop boxes. The client system further includes an input device, such as a PSTN phone device, a remote control, a keyboard, etc., and also perhaps a camera (e.g., a video camera). In one embodiment, a phone device may be integrally formed with a remote control for use in controlling the television set. The client system provides a user with an integrated user interface for the Internet, PSTN, and CATV. The system further includes a User Preference Server that stores various users' profiles including their geographic location data, demographic data, and preferences and history concerning their network access, so as to provide personalized services to the users, as disclosed in Ser. No. 10/703,959, incorporated above. The system also includes a plurality of service provider systems connected to the Internet and/or PSTN network, each associated with a particular service/product provider (e.g., a restaurant, shoe store, etc.). The system still further includes a Gatekeeper Server which connects and controls voice communication between the users' client systems and the service provider systems.

In operation, a user first requests a customized voice connection service of the present invention, perhaps by clicking on a corresponding icon displayed on the client system's display when the user first turns on the client system. After any appropriate user authentication process, the user is prompted to enter information regarding his desired destination with which he wishes to establish a voice connection (i.e., the destination he wishes to call). For example, the user may wish to order a pizza, and thus enters "pizza delivery" in a search box of an on-line phone book displayed on the client system's monitor. To that end, the Gatekeeper Server may offer an on-line phone directory function. An on-line phone directory service itself is well known in the art. After receiving a user's request for service, the Gatekeeper Server identifies one or more service/product providers whose service parameters match both the user's request for service and the user's profile. The service parameters include, for example, the type of business, business location, business hours, geographic area that the service/product provider covers, or demographic information concerning its targeted customers (e.g., children, young adults, women, etc.). The service parameters are stored in a Product/Service Database, which is also connected to the Internet. In the example above wherein the user wishes to order a pizza, the Gatekeeper Server identifies one or more service/product providers whose service/product matches the user's request for service ("pizza delivery"), and also whose geographic coverage area (delivery area) includes the geographic location of the user as stored in his user profile. Then, only those pizza restaurants who can deliver a pizza to the geographic location of the user are returned and displayed on the user's client system. As a further example, if the user has previously ordered a pizza from a certain pizza restaurant, as recorded in the user's history of network access, then this pizza restaurant may be shown at the top of the list of multiple matching pizza restaurants.

Alternatively, a user may be presented with an on-line phone book, which the user can browse (e.g., scroll up and down) using a remote control for the television set.

The user can then select and call one of the identified pizza restaurants displayed on his client system. Since most users are more familiar with calling a phone number using a standard PSTN phone set, in one embodiment of the present invention, a standard PSTN phone set is particularly provided as at least part of the input device for the client system. Once the user enters the PSTN phone number of the desired destination, the Gatekeeper Server determines which of PSTN connection or VoIP connection is preferable in each instance. For example, if a VoIP connection is available, it is selected because it is relatively less expensive than a PSTN connection, while if a VoIP connection is determined to be of poor quality or unavailable, a PSTN connection is selected. If a VoIP connection is to be established, the Gatekeeper Server maps the PSTN phone number that the user has entered into its corresponding IP address, by referring to a correlation table stored in or otherwise accessible by the Gatekeeper Server. The user then speaks with the desired destination over the phone. The selection of VoIP connection or PSTN connection is fully automatic and therefore transparent to the user; the user is not required to specify which type of voice connection he wishes to establish nor is he required to perform a different procedure based on which type of voice connection is to be established. Rather, the user simply punches in the desired PSTN phone number into a standard phone set, and the rest of the operation is fully transparent to the user.

Alternatively or additionally to calling the desired destination by entering its PSTN phone number into a standard PSTN phone set, in one embodiment, the user can initiate a call by selecting (e.g., clicking on) the desired destination to be called (e.g., a particular pizza restaurant), perhaps followed by further selecting a "call" icon shown on the client system display. Thereafter, as before, the Gatekeeper Server again determines which of VoIP connection or PSTN connection is preferable, and makes a preferred voice connection to the desired destination.

When the client system is further equipped with a camera (e.g., a video camera), the client system can be used as a video phone device so as to establish not only a VoIP connection but also a Voice and Video over IP connection.

Essentially, the present invention integrates the functions of a television, telephone, and the Internet for users, in particular for those who do not have sophisticated computer-related skills. The customized voice connection service of the present invention enables the user to make a phone call with voice and/or image using the existing television screen.

In one embodiment, when the users are using the customized voice connection service of the present invention, they are interacting with a page (like a HTML page) including graphical user icons (GUI) using a remote control for the television set. The user can select the person or service/product provider he wishes to talk to, each of whom is represented in the form of a GUI, by simply selecting the GUI associated with the desired name and a "call" icon on the television set display. In this embodiment, the users are not required to determine either an IP address or a PSTN number to make a desired connection. The Gatekeeper Server will determine which connection is best between the user and the desired destination, and automatically establishes a voice connection between the two using a suitable connection method.

It should be emphasized that the connection from the user to the other party (a service/product provider or another user of another client system) is automatically completed by the Gatekeeper Server. The user only interacts with a single interface, provided by the client system, and does not have to make a decision as to which connection to make. The Gatekeeper Server will also determine which service/product provider to connect to based on the user's profile and the service/product provider's parameters. For example, if the user is ordering a service/product that has geographical limitations, such as delivery areas, the Gatekeeper Server could locate the nearest store for the user.

When the user wishes to make a connection to another user, the Gatekeeper Server allows the user to enter a regular phone number, even for a VoIP connection. As described above, the Gatekeeper Server can map a PSTN number to its corresponding IP address, which is an automatic process fully transparent to the user. Therefore, users do not have to determine the long and complicated IP address of any desired destination, and for those who are using dynamic IP, the invention offers a much simpler way of making a connection.

In the case of a business transaction, the Gatekeeper Server may additionally provide an authentication process in order to verify the identity of the user. The Gatekeeper Server may also allow the user to confirm his order while speaking with the service/product provider, by using the remote control and the corresponding verification HTML page. In this case, the Gatekeeper Server could simultaneously transmit the HTML page with the verification data (as entered by the remote control by the user) to the service/product provider while the user continues to speak with the service/product provider.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a block diagram depicting a general system architecture for implementing the customized voice connection service according to one embodiment of the present invention;

FIG. 2 illustrates a process of matching users' profiles, as stored in a User Preference Server including a User Preference Database, with service/product providers' parameters, as stored in a Service/Product Information Database, according to one embodiment of the present invention;

FIG. 3B is a block diagram depicting an illustrative architecture of a Gatekeeper Server;

FIG. 5 is a flowchart illustrating a method of the customized voice connection service according to one embodiment of the present invention, wherein a user authentication process is included;

FIG. 6 is a flowchart illustrating a method of the customized voice connection service according to one embodiment of the present invention, wherein the Gatekeeper Server automatically identifies one or more service/product providers whose service parameters closely match the user's profile and the user's current request for service; and FIG. 7 is a sample customized voice connection page displayed on a client system, presenting a set of service/product providers identified by the Gatekeeper Server as matching the user's request for service and the user's profile.

DETAILED DESCRIPTION OF THE PREFERRED EMBODIMENT

Figure 3A:
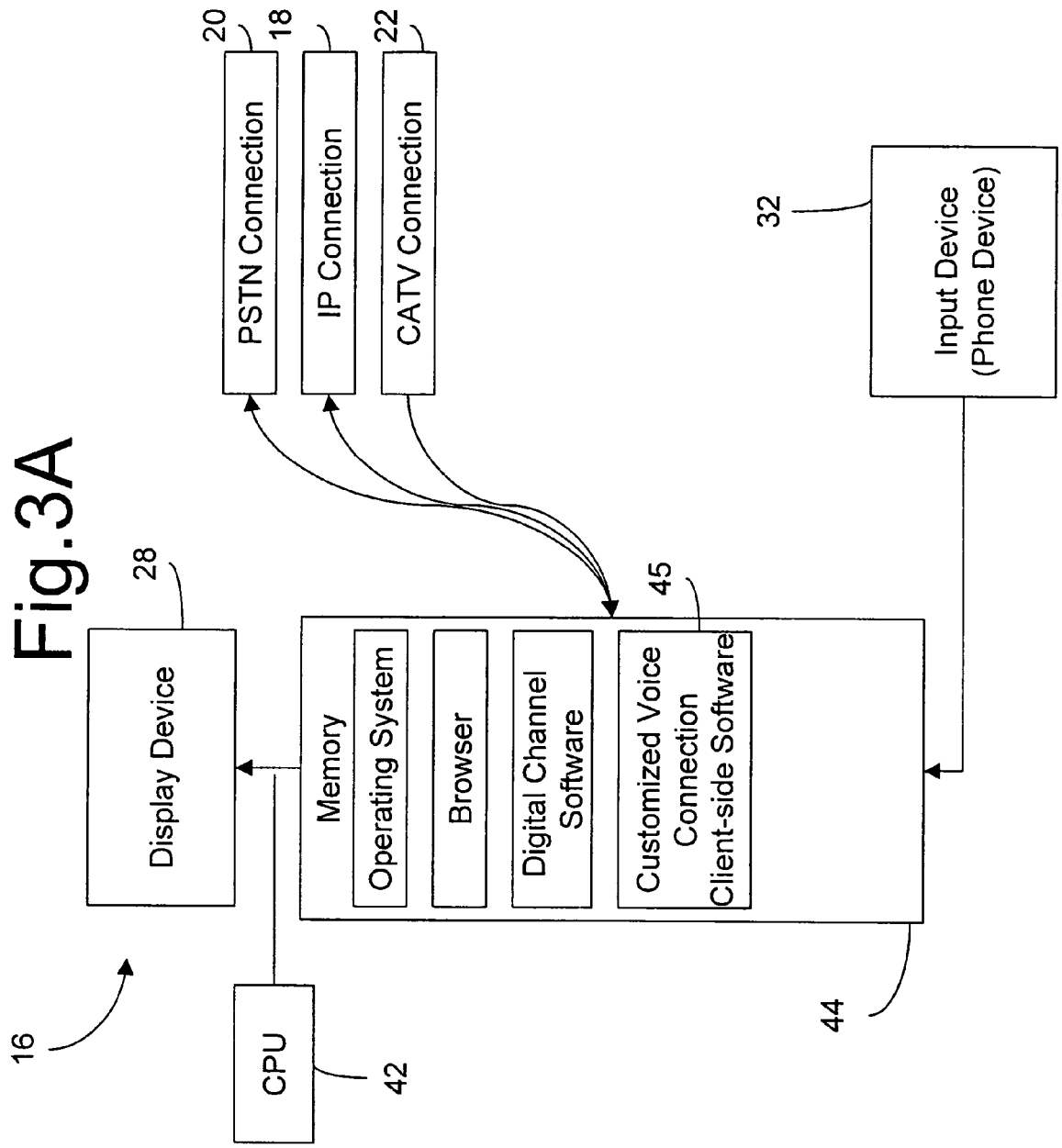
FIG. 3A is a block diagram depicting an illustrative architecture of a client system.

FIG. 1 illustrates the general system architecture suitable for implementing the customized voice connection service of the present invention. The system includes a Gatekeeper Server 10, connected with a User Preference Server having a User Preference Database 12. The Gatekeeper Server 10 is also connected with a Service/Product Database 14. The Gatekeeper Server 10 is further connected with one or more client systems 16 and one or more service provider systems 17 via the Internet 18. Each client system 16 is equipped with a settop box (STB) 26, a display 28 (usually a television set), a phone set 30, and a remote control (for the television set) 32. The display 28 may be formed of any suitable means including, but not limited to, a display of a mobile phone, smart phone, PDA, or PC, or any LCD display. Each of the client systems 16 is connected to the Internet 18, and also to PSTN network 20 and a cable television (CATV) network 22, or any other wireless television network. In the present description, the term "network," when used alone, encompasses the overall network comprising the Internet 18, PSTN network 20, and CATV (or other television) network 22. PSTN network 20 may be an analog network, or may be a digital cellular network such as GSM, GPRS, CDMA, and PCS networks. The client system 16 may be connected to the Internet 18 through connection means including, but not limited to, a modem, WiFi, WiMax, and UMTS. Each service provider system 17 may also consist of a settop box, display, phone set, and input device. As illustrated, each service provider system 17 is connected to the Internet 18 and/or PSTN network 20.

According to one aspect of the present invention, the Gatekeeper Server 10 performs the task of matching a user with an appropriate service provider or another user, thereby making it easier for the user to identify and make a voice connection to an appropriate party. To this end, referring to FIG. 2, when a user requests the customized voice connection service and further inputs a request for service, the Gatekeeper Server 10 retrieves the user's user profile including his preferences and history in his access to the network from the User Preference Server including the User Profile/Preference Database 12, while at the same time retrieving various service providers' service parameters from the Service/Product Database 14. The user profile may include, for example, the user's geographic location 36, the user's demographic information such as his age and gender 37, the user's account information such as his IP address and/or phone number 38, the user's security information for use in authenticating or verifying the identify of the user 39. Also, the user's preferences for particular products/services 40 may also be stored in and retrieved from the User Profile/Preference Database 12. The user's user profile, consisting of various pieces of information 36-40, is matched against the service parameters of various service providers as retrieved from the Service/Product Information Database 14. Specifically, the service parameters may include, for example, the business type, business hours, address, and geographic and demographic targets of each service/product provider. Comparing and matching these two sets of information against each other, the Gatekeeper Server 10 identifies one or more service providers whose service parameters best match the user's profile and also the user's current request for service.

The user profile is entered into the User Preference Server including the Profile/Preference Database 12 by the user as described in Ser. No. 10/703,959, incorporated above. Each user has to go through a process of entering his personal data such as his name, address, age, and income level. The data can also be transferred from other data sources, but in any event, the user profile has to be created before the system can begin providing the customized voice connection service to the user. Once the user profile is created, the User Preference Server 12 begins to continuously collect information about the user and further analyzes the user's behavior on the network, as also described in Ser. No. 10/703,953. This establishes a record of each user's preferences and history, and allows the Gatekeeper Server 10 to match each user's profile against the service parameters of various service/product providers with increased efficiency.

The service provider systems 17 need to provide information about the service/product providers (i.e., service parameters) to the Gatekeeper Server 10 as well. The service parameters include a brief introduction to the type of services and products that each service/product provider offers, and are collectively stored in the Service/Product Database 14. For the users to place orders for particular services/products, or to talk to sales representatives, the service/product provider systems 17 must permit an Internet-based connection and/or PSTN-based connection with each of the client systems 17. The type of available connection (Internet and/or PSTN) of each service provider system 17 is also stored in the Service/Product Database 14, and this information will be used by the Gatekeeper Server 10 to select a suitable voice communication method in each application. For example, if a service provider only permits a PSTN connection, then the Gatekeeper Server 10 will make a PSTN connection between the user and the service provider. If the service provider has both VoIP and PSTN connection capability, then the Gatekeeper Server 10 will make VoIP connections since it will be cheaper for the user. The Gatekeeper Server 10 makes the most available and economical voice connection based on the availability and quality of each connection method in each instance.

FIG. 3A illustrates an architecture of a client system for use by an individual user, according to one embodiment of the present invention. FIG. 3A depicts several key components of an exemplary client system. Those of ordinary skill in the art will appreciate that the client system 16 may include many more components than those shown in FIG. 3A, such as a network interface for connecting to the Internet, PSTN, and CATV. However, it is not necessary that all of these generally conventional components be shown in order to disclose an illustrative embodiment of the present invention. The client system includes a display device 28, for example a television set monitor. The display device 28 is connected to a CPU 42 and a memory device 44, which includes an operating system, browser, and Digital Channel software, as also described in Ser. No. 10/703,953. The memory device 44 also includes Customized Voice Connection client-side software 45, which renders the customized voice connection service available to the client system 16 as will be more fully described below in connection with FIGS. 4-6. The client system 16 also includes suitable network interface means to be connected to the PSTN network 20, the Internet 18, and CATV network 22. The client system 16 further includes an input device 32, such as a phone set, remote control, keyboard, etc., to permit the user to make various selections. In one embodiment, the input device 32 consists of or includes a PSTN phone set.

FIG. 3B depicts several of the key components of the Gatekeeper Server 10, which may consist of any standard workstation including a server and host computer as known in the art. As before, those of ordinary skill in the art will appreciate that the Gatekeeper Server 10 includes many more components than those shown in FIG. 3B, though it is not necessary that all of these generally conventional components be shown in order to disclose an illustrative embodiment of the present invention. As shown in FIG. 3B, the Gatekeeper Server 10 includes a processing unit (CPU) 42', a display 28', an input device 32', and mass memory 44', all interconnected via a bus. The Gatekeeper Server 10 also includes suitable network interface means to be connected to the Internet 18. The mass memory 44' stores an operating system for controlling the operation of the Gatekeeper Server 10 and a Web browser. The mass memory 44' also stores Customized Voice Connection server-side software 45', the operation of which will be described in detail below.

Figure 4:
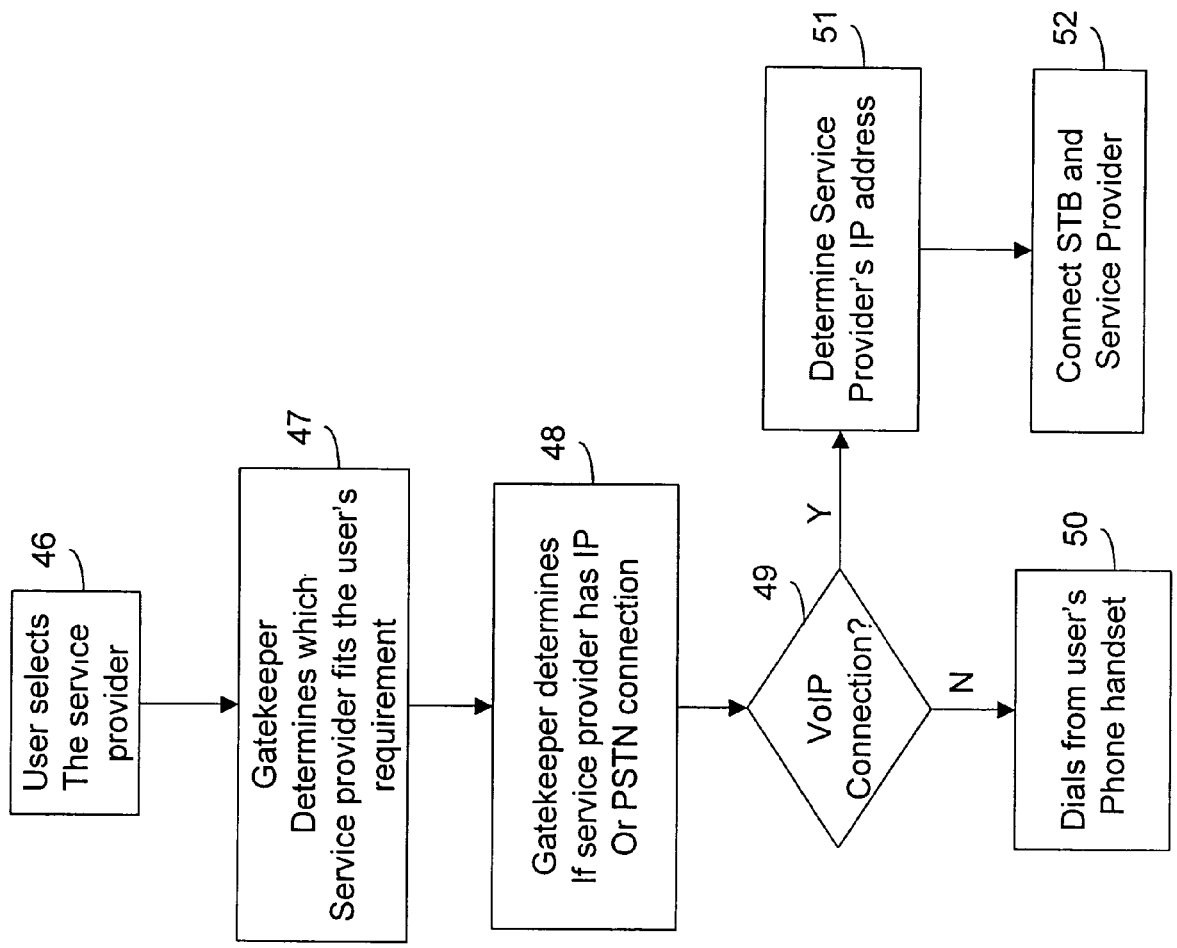
FIG. 4 is a flowchart illustrating a method of the customized voice connection service according to one embodiment of the present invention, wherein a user's client system requests a voice connection to a service provider and the Gatekeeper Server automatically establishes a suitable voice connection between the client system and the service provider.

FIG. 4 is a flowchart illustrating a process of the customized voice connection service according to one embodiment of the present invention. At block 46, the user at the client system 16 first selects which service provider he/she desires to call. The selection can be made based on a general criterion, such as "women's accessories" or "pizza" as entered into an on-line phone directory, or it can be as specific as selecting a particular store or brand name. At block 47, the Gatekeeper Server 10 identifies the service/product provider that best meets the user's selection. After finding a match, at block 48, the Gatekeeper Server 10 determines the type of connection that is available to the identified service/product provider's system 17. Then, a connection is made based on the type and availability of connections associated with the identified service provider. For example, at block 49, if it is determined that the identified service provider has both PSTN and VoIP connections, but the VoIP connection is showing poor quality or the VoIP server is currently off-line, then, proceeding to block 50, the Gatekeeper Server 10 makes a PSTN connection instead, and dials the PSTN number of the identified service provider from the client system's phone set. If, on the other hand, it is determined at block 49 that a VoIP connection is available, then at block 51, the Gatekeeper Server 10 determines the IP address of the identified service/product provider. At this point, the Gatekeeper Server 10 may refer to a suitable database that maps each PSTN phone number or other information that identifies a service/product provider to its IP address. At block 52, the Gatekeeper Server 10 connects the user's client system to the service/provider's IP address using a VoIP voice connection. In both PSTN and VoIP connections, the user would use his regular phone set to communicate with the desired service/product provider. In other words, which communication channel (PSTN or VoIP) is actually used is transparent to the user.

FIG. 5 is a flowchart illustrating a process of the customized voice connection service according to another embodiment of the present invention, including a user authentication process. At block 54, the user selects a particular service/product provider to use, for example, to order certain services/products from. At block 55, the user picks up a phone set, which is part of the client system 16. At block 56, the Gatekeeper Server 10 determines whether the user's ID needs to be authenticated or if the user is ready to make a purchase. If the determination is yes, at block 57, the Gatekeeper Server 10 prompts the user to enter his authentication code or security code. For example, the user may have a password or a smart card to verify his identity. At block 58, the Gatekeeper Server 10 confirms and authenticates the user by referring to the user's profile stored in the User Preference Server including the User Preference Database 12. Once the authentication is completed, at block 59, the user proceeds with the voice connection (e.g., to speak to a customer representative of the service/product provider) or place an order to purchase certain services or products. Referring back to block 56, if it is determined that authentication is not required, then the process proceeds directly to block 59, where the user proceeds with the voice connection or purchase.

FIG. 6 is a flowchart illustrating a process of the customized voice connection service according to another embodiment of the present invention, wherein the Gatekeeper Server 10 automatically identifies one or more service/product providers whose service parameters match the user profile and also the user's current request for service. At block 60, the Gatekeeper Server 10 receives a user's request for a certain type of service, such as a pizza delivery service. At block 61, the Gatekeeper Server 10 determines whether this request from the user requires user authentication. For example, there may be several users sharing a single client system (e.g., a television set), and each user may have different privileges/authorization to request a connection to a suitable service/product provider and/or to make a purchase. Therefore, the authentication process may also take place after making a successful connection to a suitable service/product provider but prior to making an actual purchase. If authentication is required, at block 62, the Gatekeeper Server 10 searches the User Preference Server 12 for the user's password or other means of identification to authenticate the user. At block 63, if it is determined that the user is not authorized, in block 64, the operation is aborted. At block 63, if it is determined that the user is authorized, the Gatekeeper Server 10 proceeds to block 65, where it searches the User Preference Server including the User Profile/Preference Database 12 to locate the user's profile. At block 66, the user's current request for service (e.g., pizza delivery service) together with the user's profile (his geographic location, demographic data, etc.) are matched against the service parameters of various service/ product providers (e.g., geographic coverage) as stored in the Service/Product Database 14. For example, suitable service/product providers whose geographic and demographic parameters match the geographic location and demographic information of the user are identified, and these suitable service/product providers are returned to the client system 16 for display. FIG. 7 illustrates a sample customized voice connection page 70, showing the user's current request for service 71 ("pizza delivery") and a set of service/product providers 72, 73, . . . , which have been identified as matching the user's current request for service and the user's profile. Then, once the user selects one of the service/product providers, at block 67, the Gatekeeper Server 10 connects the user's client system 16 and the user-selected service/product provider system 17 via either a VoIP connection or a PSTN connection, in the manner described above.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A computer-implemented system for providing a customized voice connection service, the system comprising:
    (a) a network comprising the Internet and Public Switched Telephone Network (PSTN);
    (b) multiple client systems connected to the network, each client system comprising a display, an input device, and a settop box, and each client system being associated with at least one user;
    (c) multiple service provider systems connected to the network, each service provider system being associated with a service provider having a predefined set of service parameters;
    (d) a User Preference Server connected to the network, the User Preference Server including a User Preference Database containing data related to each user's profile comprising history and preferences in his network access;
    (e) a Gatekeeper Server connected to the network, the Gatekeeper Server being configured to perform the steps of:
        (i) handling Voice over IP (VoIP) phone calls between the settop boxes;
        (ii) connecting a user settop box directly to an appropriate service provider system when the user associated with the user settop box enters a request for service to the user settop box, comprising:
            (1) receiving the settop box user's profile;
            (2) identifying one or more service providers whose service parameters match the settop box user's profile and the request for service; and
            (3) connecting the settop box to the identified one or more service providers via a VoIP connection or a PSTN connection.

2. The system of claim 1, wherein the user profile further comprises the user's geographic information and demographic information.

3. The system of claim 1, wherein step (e)(i) of handling VoIP phone calls between the settop boxes further comprises:
    receiving an incoming call from a first settop box, the incoming call comprising a PSTN phone number associated with a second settop box which is the desired destination of the incoming call;
    mapping the PSTN phone number associated with the second settop box to its corresponding Internet address; and
    connecting the second settop box at the mapped Internet address to the first settop box.

4. The system of claim 1, wherein step (e)(ii)(1) of receiving the settop box user's profile comprises:
    receiving the user's profile from either the User Preference Database or registration information provided by the user via his settop box.

5. The system of claim 1, wherein step (e)(ii)(2) of identifying one or more service providers whose service parameters match the settop box user's profile and the request for service comprises:
    identifying one or more service providers whose service parameters match the nature of the settop box user's request for service; and
    identifying one or more service providers whose service parameters match the user profile of the settop box user.

6. The system of claim 1, wherein step (e)(ii)(3) of connecting the settop box to the identified one or more service providers comprises:
    identifying the service provider to be connected to the user's settop box;
    determining the type of connection to be made between the user's settop box and the service provider; and
    connecting the settop box to the service provider.

7. The system of claim 6, wherein the step of determining the type of connection to be made between the user's settop box and the service provider comprises:
    selecting a PSTN connection only if a VoIP connection is not available.

8. The system of claim 1, wherein the PSTN network comprises a digital cellular network selected from a group consisting of GSM, GPRS, CDMA, and PCS networks.

9. A client system connected to the Internet, PSTN, and cable TV network, the Internet and PSTN being further connected to one or more service providers, the client system comprising:
    (a) a monitor;
    (b) an input device; and
    (c) a settop box, being configured to perform the steps of:
        (i) receiving a user's request for a particular service provider or a call-destination settop box;
        (ii) dialing a PSTN phone number associated with the particular service provider or the call-destination settop box;
        (iii) communicating with the particular service provider or the call-destination settop box via PSTN or VoIP; and
        (iv) selecting a product/service that the user wishes to order from the particular service provider.

10. The client system of claim 9, wherein step (c)(i) of receiving a user's request for a particular service provider or a call-destination settop box comprises:
    displaying on the monitor multiple choices of service providers and call-destination settop boxes; and
    receiving a user's selection of a particular service provider or a call-destination settop box via the input device.

11. The client system of claim 9, wherein the multiple choices of service providers and call-destination settop boxes are displayed in the form of a graphical user interface (GUI) or a phone book.

12. The client system of claim 9, wherein the input device comprises a PSTN telephone device, and step (c)(ii) of dialing a PSTN phone number associated with the particular service provider or the call-destination settop box comprises a step selected from a group consisting of:
    dialing on PSTN using the telephone device; and
    initiating a VoIP phone session using the telephone device.

13. The client system of claim 12, wherein step (c)(ii) of dialing a PSTN phone number associated with the particular service provider or the call-destination settop box further comprises initiating a video conference call using a video camera device.

14. The client system of claim 9, wherein step (c)(iv) of selecting the product/service that the user wishes to order from the particular service provider comprises:
displaying a number of choices of products/services available from the particular service provider on the monitor;
receiving a user selection of a product/service to be ordered via the input device; and
communicating the user selection of the desired product/service to the service provider over a PSTN or VoIP connection.

15. The client system of claim 14, wherein the input device comprises a telephone set.

16. The client system of claim 9, which is connected to the Internet through connection means selected from a group consisting of a modem, WiFi, WiMax, and UMTS.

17. The client system of claim 9, which further comprises a browser for viewing HTML pages, and other file formats available on the Internet, through an IP connection.

18. The client system of claim 9, wherein the monitor comprises a display selected from a group consisting of a mobile phone display, smart phone display, PDA, LCD display, and PC monitor.

19. A service provider system connected through a network to plural user settop boxes, the network comprising the Internet having the Gatekeeper Server and PSTN, the service provider system being configured to perform the steps of:
(a) connecting to the network;
(b) receiving direct voice communication from a user settop box; and
(c) providing its services directly to the user settop box through the network.

20. The service provider system of claim 19, wherein step (a) of connecting to the network comprises:
providing to the Gatekeeper Server the nature of services offered by the service provider; and
providing to the Gatekeeper Server service parameters of the service provider.

21. The service provider system of claim 19 wherein step (b) of receiving direct voice communication from a user settop box comprises:
answering voice communications from a user settop box;
taking orders or requests for services/products from the user settop box; and
receiving confirmation of the orders or requests from the user settop box.

22. The service provider settop box of claim 19, wherein step (c) of providing its services directly to the user settop box through the network comprises:
confirming a request received from a user settop box; and
delivering the requested services after receiving the confirmation of the request from the user settop box.

* * * * *

UNITED STATES PATENT AND TRADEMARK OFFICE
CERTIFICATE OF CORRECTION

PATENT NO. : 7,573,988 B2  Page 1 of 1
APPLICATION NO. : 10/860590
DATED : August 11, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1467 days.

Signed and Sealed this

Seventh Day of September, 2010

David J. Kappos
*Director of the United States Patent and Trademark Office*